April 11, 1944.   A. F. HASKINS   2,346,578
DIAL INDICATOR
Filed Dec. 17, 1942
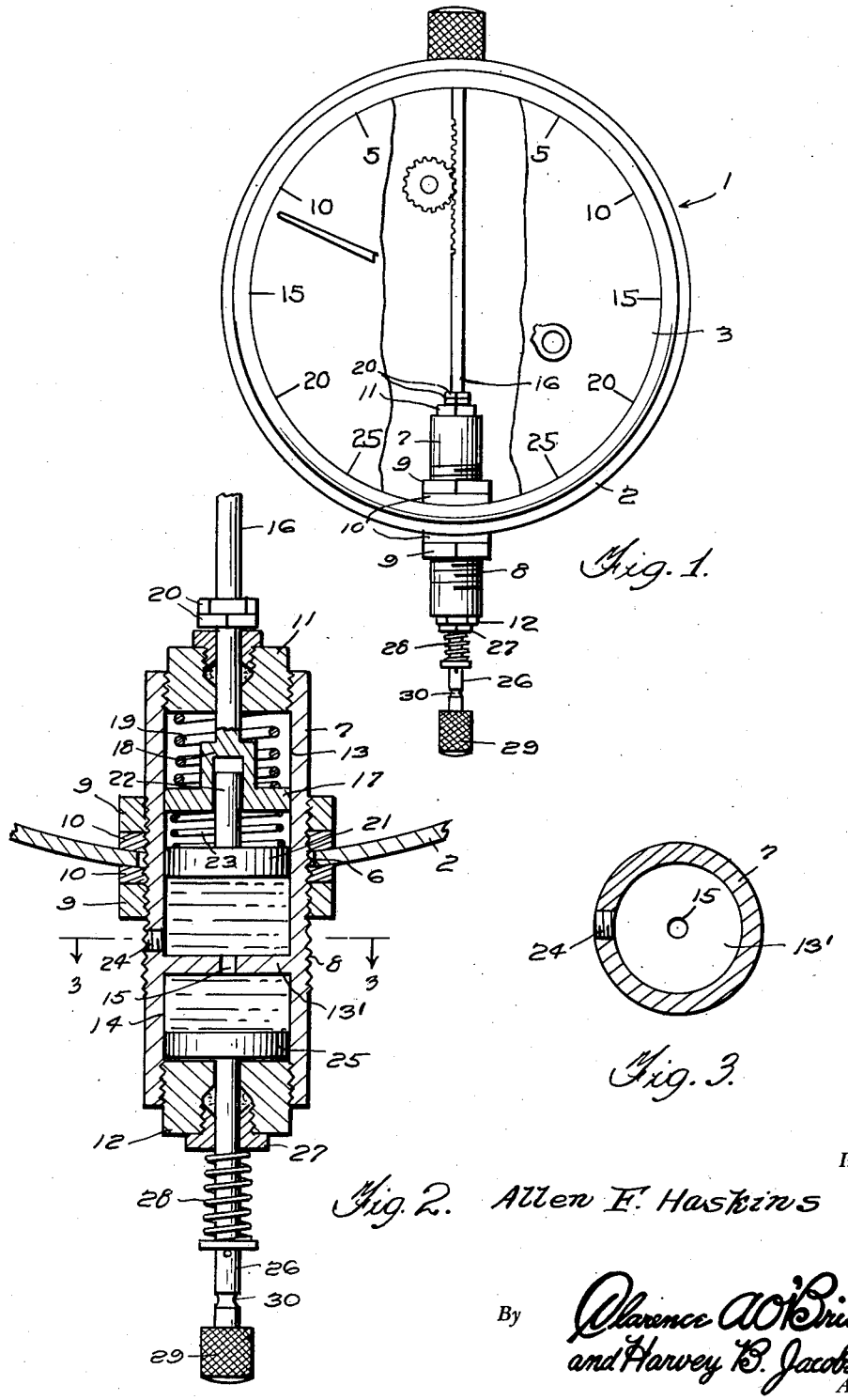
Inventor
Allen F. Haskins
By Clarence A. O'Brien
and Harvey B. Jacobson
Attorneys Patented Apr. 11, 1944

2,346,578

UNITED STATES PATENT OFFICE 2,346,578

DIAL INDICATOR

Allen F. Haskins, Cranston, R. I.

Application December 17, 1942, Serial No. 469,383

1 Claim. (Cl. 33—172)

The present invention relates to new and useful improvements in dial indicators, and has for its primary object to provide a hydraulic shock absorbing unit of novel construction for an instrument of this character, whereby the delicate operating mechanism of said instrument will be protected against damage.

Another very important object of the invention is to provide a hydraulic shock absorbing unit of the character described which is adapted for use in conjunction with various indicator casings and mechanisms.

Other objects of the invention are to provide a hydraulic shock absorber for dial indicators which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in front elevation of a dial indicator equipped with a hydraulic shock absorber constructed in accordance with the present invention, a portion of the face plate of the instrument being broken away.

Figure 2 is a view in vertical section through the shock absorber.

Figure 3 is a view in horizontal section, taken substantially on the line 3—3 of Figure 2.

Referring now to the drawing in detail, it will be seen that reference numeral 1 designates generally the body of a dial indicator comprising an annular casing 2 having mounted in its front portion a face plate 3. A pointer 4 is movable around the face plate 3, said pointer being actuated by means including a pinion gear 5 in the casing 2.

The lower portion of the casing 2 has formed therein a circular opening 6. The opening 6 accommodates a cylinder 7 which projects into the casing 2. The cylinder 7 is externally threaded, as at 8. Securing nuts 9 are threaded on the cylinder 7 on the inside and outside of the casing 2, suitable washers or pads 10 being interposed between said nuts and said casing.

Closure plugs 11 and 12 are threaded in the end portions of the cylinder 7. An integral partition 13' in the lower portion of the cylinder 7 divides said cylinder into comparatively large and small upper and lower compartments 13 and 14, respectively, for the reception of a suitable fluid. The chambers 13 and 14 communicate with each other for the passage of the fluid therebetween through a port 15 in the partition 13'.

A rack bar 16, which is operatively engaged with the pinion 5 in the indicator 1, has its lower end portion formed to provide a rod which extends slidably into the upper portion of the chamber 13 through the plug 11. A plunger 17 on the lower end of the rack bar 16 is operable in the chamber 13 of the cylinder 7. The plunger 17 includes an air pocket 18, the purpose of which will be presently set forth. A coil spring 19 yieldingly urges the plunger 17 downwardly in the chamber 13. Nuts 20 on the rack bar 16 positively limit the downward movement of the plunger 17 under the influence of the coil spring 19.

Also operable in the chamber 13, below the plunger 17, is a plunger 21. The plunger 21 comprises a piston or the like 22 in the form of a stem which is slidably engaged in the air pocket 18 of the plunger 17. A comparatively light coil spring 23 is provided between the plungers 21 and 17. It will be observed that the fluid in the chamber 13 is confined below the plunger 21. A removable plug 24 is threaded into the cylinder 7 to permit air to be bled from the chamber 13 when necessary.

A plunger 25 is operable in the lower chamber 14. The plunger 25 includes a stem 26 which extends slidably through the plug 12. A packing 27 is provided in the plug 12 for the plunger stem 26. A return spring 28 for the plunger 25 is operatively connected to the stem 26. Threadedly mounted on the lower end portion of the stem 26 is a work contact 29. The stem 26 is further provided with a reduced neck portion or groove 30 for the reception of the usual fork on a conventional lifting lever (not shown).

It is thought that the operation of the invention will be readily apparent from a consideration of the foregoing. Briefly, upward movement of the plunger 25 forces the fluid from the lower chamber 14 into the upper chamber 13 thereby forcing the piston 21 upwardly against the tension of its spring 23 and, in turn, elevating the plunger 17 against the tension of its comparatively heavy coil spring 19. Thus, the rack bar 16 is moved upwardly for actuating the pointer 4 of the instrument. The construction and arrangement is such that any sudden shock or strain to which the plunger 25 is subjected will be cushioned or absorbed before it reaches the rack bar 16. The comparatively small port 15 in the partition 13' prevents the too rapid passage of the fluid between the chambers 14 and 13. The plungers 17, 21 and 25 are returned to their normal positions by their respective coil springs 19, 23 and 26. The piston 22, operating in the air pocket 18, provides a pneumatic cushion between the plungers 21 and 17. By removing the plug 24, air may be bled from the chamber 13 after said chamber has been charged with the fluid. The securing nuts 9 facilitate adjustment of the cylinder 7 in the annular casing 2.

It is believed that the many advantages of a dial indicator embodying the present invention will be readily understood, and although a preferred form of the device is as illustrated and described, it is to be understood that changes in the details of construction and in the combination and arrangement of parts may be resorted to which will fall within the scope of the invention as claimed.

What is claimed is:

A shock absorbing unit for dial indicators comprising a cylinder, means for mounting said cylinder in the casing of the indicator, a rack bar, for operative connection with the pointer of the indicator, extending slidably into the cylinder, a plunger on the rack bar operable in the cylinder, said plunger including an air pocket, a second plunger operable in the cylinder and comprising a piston operable in the air pocket, a third plunger operable in the cylinder in opposed relation to the second-named plunger, the third named plunger being engaged with work for actuation in one direction thereby, a fluid in the cylinder for operatively connecting the third-named plunger to the second and first-named plungers for actuating same in said one direction, a partition in the cylinder between the third and the second-named plungers having a port therein for the passage of the fluid, and springs operatively connected to all of the plungers for actuating said plungers in the opposite direction.

ALLEN F. HASKINS